J. F. O'CONNOR.
HIGH CAPACITY FRICTION GEAR.
APPLICATION FILED MAR. 23, 1917.
1,300,462.
Patented Apr. 15, 1919.
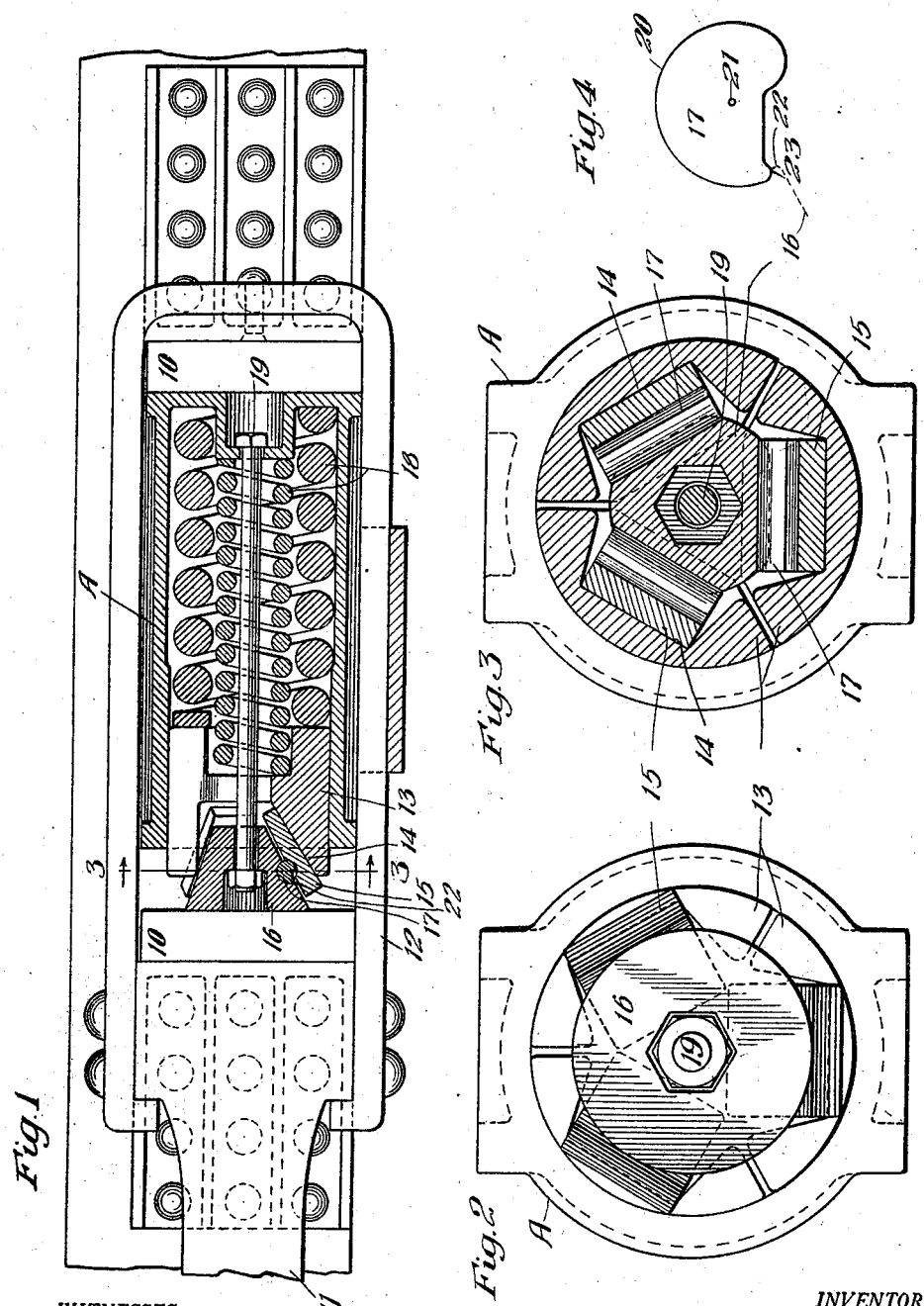
WITNESSES:
Wm. Geiger
INVENTOR.
John F. O'Connor
BY George I. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

HIGH-CAPACITY FRICTION-GEAR.

1,300,462.      Specification of Letters Patent.      Patented Apr. 15, 1919.

Application filed March 23, 1917. Serial No. 156,915.

*To all whom it may concern:*

Be it known that I, JOHN F. O'CONNOR, a citizen of the United States, residing at Chicago, in the county of Cook and State of Illinois, have invented a certain new and useful Improvement in High-Capacity Friction-Gears, of which the following is a full, clear, concise, and exact description, reference being had to the accompanying drawings, forming a part of this specification.

This invention relates to improvements in high capacity friction gears.

The object of the invention is to provide a high capacity friction gear wherein is employed an expanding constant-angle wedge.

In the drawing forming a part of this specification, Figure 1 is a longitudinal vertical section and part side elevation of a draft rigging showing my improvements in connection therewith. Fig. 2 is a front end view of the gear proper, upon an enlarged scale. Fig. 3 is a vertical transverse sectional view taken upon the line 3—3 of Fig. 1, and Fig. 4 is an end elevation of one of the volute cams employed in my arrangement.

In the drawing, 10—10 denote front and rear followers of a draft rigging coöperable with the usual stops on the draft sills, the gear being connected to the draw bar 11 by yoke 12 in the usual manner.

The improved friction gear, as shown, comprises a combined friction shell and spring casing A, a plurality of circularly arranged friction shoes 13—13 coöperable with the shell, each of said shoes having an inner wedge face 14, a plurality of auxiliary wedge members 15—15, a pressure-transmitting member 16, and elements 17—17 in the form of volute cams interposed between the pressure-transmitting member and the wedge members. To resist the movement of the friction shoes, a two-coil spring 18 is employed and to hold the parts in assembled relation, a connecting bolt 19 is used, the same extending through the pressure-transmitting member, between the shoes, and through a suitable perforation in a boss at the rear end of the member A.

In Fig. 4 one of the elements 17 is shown in end elevation and as there shown, the main outer surface 20 thereof is in the form of a volute cam with the point 21 as the generating center. Each of the members 17 is elongated, as clearly shown in Fig. 3, to give the effect of a roller and thus provide an elongated bearing contact between the pressure-transmitting member and each of the wedge members. Furthermore, the pressure-transmitting member 16 is provided with an overhanging shoulder 22 on each of its faces to engage the edge 23 of each corresponding element 17 so that, as the pressure-transmitting member 16 is forced inwardly relatively to the friction shell under either buff or draft, the cam elements 17 will be rotated due to the engagement of the shoulders 22 with the edges 23. Hence, as the cam elements are thus rotated, it is apparent that the distance between the pressure-transmitting member and the wedge members will be increased dependent upon the amount of rotation of the cam elements. In this manner, I obtain a wedge which is expansible and at the same time maintain a constant angle between the wedge and the friction shoes. Furthermore, by employing the volute cams, as above described, the pressure-transmitting member will readily release upon removal of the pressure under either buff or draft.

Although I have herein shown and described what I now consider the improved embodiment of the invention, the same is merely illustrative and I contemplate all changes and modifications that come within the scope of the claims appended hereto.

I claim:

1. In a friction shock absorbing mechanism, the combination with a friction shell, friction shoes coöperable therewith, and a spring, of a pressure-transmitting member, wedge members interposed between the pressure-transmitting member and each of the friction shoes, and elements interposed between the pressure-transmitting member and each of the wedge members, said elements being of roller form and having volute cam surfaces.

2. In a friction shock absorbing mechanism, the combination with a friction shell, friction shoes coöperable therewith, and a spring, of a pressure-transmitting member having a plurality of faces corresponding to the number of friction shoes, each of said faces being recessed and provided with a shoulder, and elements in the form of volute cams located within said recesses and adapted to be engaged by the corresponding shoulders to thereby insure rotation of said elements upon actuation of the shock absorbing mechanism.

3. In a friction shock absorbing mechanism, the combination with a friction shell, friction shoes coöperable therewith, and a spring, of a pressure-transmitting member having a plurality of faces corresponding to the number of friction shoes, a plurality of wedge members interposed between the pressure-transmitting member and the friction shoes, said pressure-transmitting member and wedge members being all provided with corresponding recesses and the pressure-transmitting member with shoulders adjacent the recesses therein, and elements interposed between the pressure-transmitting member and the wedge member and disposed in said recesses, said elements being in the form of volute cams adapted to be rotated by the pressure-transmitting member upon actuation of the shock absorbing mechanism.

4. In a friction shock absorbing mechanism, the combination with a friction shell, friction shoes coöperable therewith, and a spring, of a constant angle expansible wedge coöperable with said shoes, said wedge comprising a central pressure-transmitting member, a plurality of auxiliary members disposed around the pressure-transmitting member and engaging the shoes, and a plurality of rolling cams interposed between the pressure-transmitting member and the auxiliary members.

In witness that I claim the foregoing I have hereunto subscribed my name this 7th day of March, 1917.

JOHN F. O'CONNOR.

Copies of this patent may be obtained for five cents each, by addressing the "Commissioner of Patents, Washington, D. C."